(12) United States Patent
Elms et al.

(10) Patent No.: US 7,437,765 B2
(45) Date of Patent: Oct. 14, 2008

(54) SENSITIVE DISPLAY SYSTEM

(75) Inventors: Kim Elms, Carindale (AU); Rainer Ruggaber, Paddington (AU); Elmar Dorner, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 745 days.

(21) Appl. No.: 10/452,909

(22) Filed: Jun. 3, 2003

(65) Prior Publication Data
US 2004/0015729 A1 Jan. 22, 2004

Related U.S. Application Data

(60) Provisional application No. 60/384,827, filed on Jun. 4, 2002.

(51) Int. Cl.
*G06F 7/04* (2006.01)
*G06G 5/00* (2006.01)
*H04N 7/18* (2006.01)
*G05B 19/00* (2006.01)

(52) U.S. Cl. .................. 726/26; 345/615; 348/156; 700/13

(58) Field of Classification Search .......... 726/2, 726/28, 34, 26; 715/716, 733; 342/28; 380/25; 713/193
See application file for complete search history.

(56) References Cited

U.S. PATENT DOCUMENTS

| 5,471,616 | A | * | 11/1995 | Johnson et al. ............. 726/34 |
| 5,629,981 | A | * | 5/1997 | Nerlikar ...................... 713/168 |
| 6,002,427 | A | * | 12/1999 | Kipust ......................... 348/156 |
| 6,189,105 | B1 | | 2/2001 | Lopes |
| 6,330,676 | B1 | | 12/2001 | Kelsey |
| 6,374,145 | B1 | * | 4/2002 | Lignoul ........................ 700/17 |
| 6,401,209 | B1 | * | 6/2002 | Klein ............................ 726/34 |
| 6,570,610 | B1 | * | 5/2003 | Kipust ........................ 348/156 |

(Continued)

FOREIGN PATENT DOCUMENTS

DE 19543455 11/1997

(Continued)

OTHER PUBLICATIONS

Pountain, Dick, "Track People with Active Badges," Byte, vol. 18, No. 13, pp. 57-58, 62, 64, ISSN: 0360-5280, XP000414927.

(Continued)

*Primary Examiner*—Emmanuel L Moise
*Assistant Examiner*—Techane J Gergiso
(74) *Attorney, Agent, or Firm*—Fish & Richardson P.C.

(57) ABSTRACT

A sensitive display system is described. The sensitive display system allows for mediation of content provided from a source to a recipient, such as from a web server to a web browser. Mediation may involve intercepting and augmenting the content so as to restrict or otherwise control information displayed on a display of the recipient device. In this way, the sensitive display system allows restricted information to be replaced with security status messages, or removed entirely. For example, when a user comes within a specified distance from the sensitive display area, a security classification level of the approaching user is used to determine whether there should be any change in the display. If so, a mediating device causes a browser push to occur, to thereby block or otherwise restrict some or all of the display.

28 Claims, 7 Drawing Sheets

U.S. PATENT DOCUMENTS

| | | | |
|---|---|---|---|
| 6,614,350 B1* | 9/2003 | Lunsford et al. | 340/572.1 |
| 7,079,652 B1* | 7/2006 | Harris | 380/258 |
| 2002/0095222 A1* | 7/2002 | Lignoul | 700/13 |
| 2003/0107584 A1* | 6/2003 | Clapper | 345/619 |
| 2005/0151623 A1* | 7/2005 | von Hoffmann | 340/5.61 |
| 2007/0209014 A1* | 9/2007 | Youmtoub | 715/771 |

FOREIGN PATENT DOCUMENTS

| | | |
|---|---|---|
| EP | 0929024 | 7/1999 |
| GB | 2 248 951 | 4/1992 |
| WO | WO 02/31787 | 4/2002 |

OTHER PUBLICATIONS

"Method of Enabling the User to Secure any Objects on the Desktop," *IBM Technical Bulletin*, Apr. 1994, 37(04A): 1.

"Proximity Activated Computer Console Lock," *IBM Technical Bulletin*, Nov. 1992, 35(6):4.

* cited by examiner

SENSITIVE DISPLAY SYSTEM

CROSS-REFERENCE TO RELATED APPLICATIONS

This application claims priority from U.S. Provisional Application No. 60/384,827, filed Jun. 4, 2002, and titled SENSITIVE DISPLAY SYSTEM.

TECHNICAL FIELD

This description relates to display systems.

BACKGROUND

Conventional systems exist that allow users to view content and information displayed on a screen. Examples of such screens include computer monitors, laptop screens, personal digital assistant (PDA) displays, and cell phone displays. Such display systems may be stationary, or may have various degrees of portability.

In some cases, display systems are used to display information that is intended to be viewed only by a particular person or group of people. To the extent that such displayed information is viewed by unintended parties, due to a location of the device and/or a location of the unintended party, classified or otherwise private information may be distributed to an unintended or otherwise undesirable recipient.

SUMMARY

According to one general aspect, secure viewing of a display screen is provided. A communication is transmitted from a server computer to a client computer, where the client computer is operable to communicate with the display screen to display the communication. A presence within a pre-determined distance of the display screen of a person who is unauthorized to view a portion of the communication is determined, and a section of the display screen corresponding to the portion is obscured.

Implementations may have one or more of the following features. For example, in transmitting the communication, the communication may be intercepted at an intermediate device.

In determining the presence, identification information related to the person may be transmitted to a security system, and a security clearance level of the unauthorized person may be received from the security system, based on the identification information. In this case, in transmitting identification information and receiving the security clearance level, the identification information may be transmitted and the security clearance level may be received using a publish/subscribe messaging system.

Further, in transmitting identification information and receiving the security clearance level, the identification information may be transmitted and the security clearance level may be received using a content-based messaging system. Obscuring the section of the display screen may include selecting the portion to be obscured based on the security clearance level.

In transmitting the communication, a message may be attached to the communication, the message containing fields. Data may be inserted into the fields, the data including the identification information and the security clearance information, and the portion may be selected based on the data. Further in this case, the message may be include a hidden frame that is not visible on the display screen as part of the communication.

In obscuring the section, a current version of the communication may be saved. It may be determined that the person has moved outside of the pre-determined distance, and the communication may be displayed in its entirety, including the portion.

In obscuring the section, an active session may be maintained with the client computer, and an automatic refresh of the communication may be performed with respect to the client computer.

In determining the presence, location information may be tracked, with respect to the display screen, of a group of persons, including the person. In this case, tracking location information may include viewing the location information on a user interface, and updating the location information as it changes with respect to a movement of the group of persons. Also, updating the location information may include selecting an icon on the user interface that is operable to represent the location information, where the icon represents the person, and moving the icon on the user interface, to thereby represent a location of the person relative to the display screen.

In tracking location information, a transmission may be received from a transmitter associated with the person once the person is within the predetermined distance of the display screen. The transmission may contain identification information related to the person.

According to another general aspect, a system for securing a portion of a display screen from viewing includes a positioning subsystem operable to determine position information, relative to the display screen, of any one of a group of potential viewers of the display screen, a security subsystem operable to access identification information and corresponding security clearance information identifying a security clearance level of each of the group of potential viewers, and a mediation subsystem operable to receive data from a server computer and forward the data to a client computer for display on the display screen with a portion of the data obscured from display, where the portion is selected based on the position information received from the positioning subsystem and the security clearance information received from the security database.

Implementations may have one or more of the following features. For example, the mediation subsystem may be operable to obscure the portion based on a position indication in the position information that a potential viewer is within a pre-determined distance of the display screen, and a security indication in the security clearance information that the potential viewer is associated with a security clearance level that is insufficient to permit viewing of the portion. In this case, a context subsystem may be included that is operable to determine the position indication and the security indication for forwarding to the mediation subsystem.

The mediation subsystem may include a session manager that is operable to maintain an active session between itself and the client computer. In this case, the mediation subsystem may be operable to obscure the portion by initiating a refresh of the display screen. Further, the mediation subsystem may be operable to initiate the refresh by including a hidden frame with the data when forwarding the data to the client computer.

The positioning subsystem may include a user interface operable to display icons representing the position information of the group of potential viewers. In this case, a movement of a selected icon from among the icons on the user interface may represent updated position information relative to a selected one of the potential viewers.

The positioning subsystem may include a receiver operable to receive updated position information from a location transmitter associated with a specific one of the group of potential viewers, to thereby track a movement of the specific one of the group of potential viewers.

Also, a communications subsystem may be included that is operable to route the position information and the security clearance information between the positioning subsystem, the security subsystem, and the mediation subsystem. In this case, the communications subsystem may include a publish/subscribe messaging system, or a content-based messaging system.

According to another general aspect, portions of a page of information are selectively displayed on a display screen. A potential viewer of the display screen is determined to be within viewing distance of the display screen and is unauthorized to view a determined portion of the page of information, based on location information and security information relating to the potential viewer. The page of information is refreshed with a modified version of the page of information, the modified version having the determined portion blocked from being displayed, and the modified version is transmitted for display on the display screen.

Implementations may have one or more of the following features. For example, in determining that the potential viewer of the display screen is within viewing distance of the display screen and is unauthorized to view a determined portion of the page of information, the location information may be tracked on a user interface operable to display an icon representing a location of the potential viewer relative to the display screen.

In determining that the potential viewer of the display screen is within viewing distance of the display screen and is unauthorized to view a determined portion of the page of information, the location information may be received from a location transmitter associated with the potential viewer and tracked. Also in determining that the potential viewer of the display screen is within viewing distance of the display screen and is unauthorized to view a determined portion of the page of information, the location information and the security information may be transmitted to a context subsystem that is operable to perform the determining and output a modification order containing instructions for creating the modified version, and the modification order may be transmitted to a mediation subsystem operable to perform the refreshing the page of information, based on the modification order. In this case, in transmitting the location information, the security information, and the modification order, the location information, the security information, and the modification order may be routed using a content-based messaging system.

In refreshing the page of information, a current version of the page of information may be obtained from a server computer storing the current version. In refreshing the page of information, a cached version of the page of information may be sent from a proxy server storing the cached version.

The details of one or more implementations are set forth in the accompanying drawings and the description below. Other features will be apparent from the description and drawings, and from the claims.

DETAILED DESCRIPTION

Figure 1:
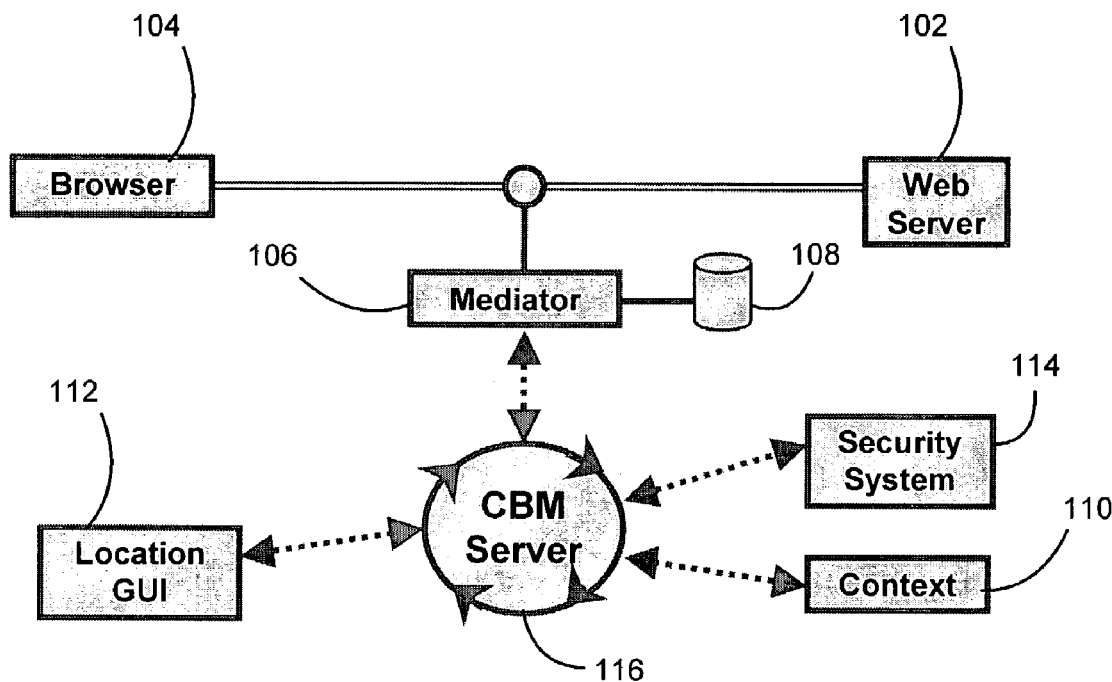
FIG. 1 is a block diagram of a sensitive display system.

FIG. 1 is a block diagram of a sensitive display system 100. In FIG. 1, a web server 102 distributes content to one or more browsers 104 by way of a mediator 106. Content distributed by the web server 102 may include, for example, hyper-text markup language (HTML) content, extensible markup language (XML) content, or other types of content that may be distributed using a computer network.

The web server 102 may be connected to the browser 104 and the mediator 106 via virtually any type of wide area network (WAN) or local area network (LAN), including, for example, the public Internet or an enterprise-wide, private Intranet. Also, in FIG. 1 and following figures, the browser 104 is merely representative of techniques for displaying information on a screen of a client device, where that information is received from a server (such as the web server 102) at the client device. Many other techniques exist for displaying information on a screen, including, for example, image viewers, document processing software, and electronic mail (email) viewers.

The mediator 106 may be similar in design to a proxy device, which is used to, for example, intercept or otherwise receive content that is distributed from a server to a client. Such functionality may be useful in, for example, ensuring that previously-requested content and/or content that is anticipated to be requested is easily and quickly available to a client. In this way, the client may receive the content in an expedited fashion, relative to retrieving the content directly from an associated server.

The mediator 106 is operable to view requests from the browser 104, and to intercept (e.g., corresponding) information transmitted from the server 102. The mediator 106 also maintains an active session with the browser, as discussed in more detail below. A database 108 is operable to, for example, cache data (e.g., values in a form being filled out using the browser 104) that is passed between the browser 104 and the server 102. As discussed in more detail below, the sensitive display system 100 of FIG. 1 is operable to temporarily obstruct a display of such data (values) on the browser 104, and the just-described caching functionality of the database 108 ensures that such data (values) are not lost during the obstruction process(es).

The mediator 106 accesses relevant information, including: security information relative to information that is currently displayed on the browser 104; a location of the browser 104 (i.e., a location of a client device on which the browser 104 is running); and security classification(s) of all users within a predetermined area of the browser 104. The mediator 106 is thus able to modify information actually being displayed on the browser 104 at a given point in time, so as to restrict a display of classified, secure, or otherwise private information being shown on the browser 104. In this way, content that is kept secure in its transmission over the relevant network is also kept secure while being displayed.

In other words, the sensitive display system 100 tracks information about a location and security classification of users within a pre-determined distance of the browser 104 (as well as location information regarding the browser 104 and its associated device). Specifically, in the example of the sensitive display system 100 of FIG. 1, a context manager 110 accepts security information (e.g., specific classification levels) about potential users of the system 100 from a security system 114.

The context manager 110 resolves the security/user information relative to location information obtained from a location graphical user interface (GUI) 112, which provides information about a current location of the relevant users and/or devices. The context manager 110 compares the security and location information to the content intercepted by the mediator 106 from webserver 102, and makes a decision about what, if any, information should be restricted from being displayed on the browser 104, and communicates this information to the mediator 106.

In the system 100, information between the mediator 106, the context manager 110, the security system 114, and the location GUI 112 is shared via a messaging service such as a content-based messaging (CBM) service implemented in a CBM server 116. The CBM server 116 allows the various messages to be routed, based only on actual content of the messages being delivered. More specifically, the CBM server 116 may have information about specific words, phrases, (location/security) information, or other content within a message. Thus, the CBM server may route the message based on this content, and not on conventional addressing information that identifies and designates a particular recipient.

Further, the CBM server 116 allows messaging which is asynchronous and immediate, in that a producer of a message need not wait for a recipient to request that message. The CBM server 116 thus insures that the context manager 110 has the information necessary to make decisions about whether and how to restrict information shown on the browser 104, and further ensures that decisions of the context manager 110 are shared in a timely fashion with the mediator 106 for appropriate implementation.

For example, it may be the case that multiple, co-located browsers 104 are displaying different information at a given point in time. If a person with a given security level approaches, different portions of each of the multiple browsers 104 may have to be obscured. Similarly, if two persons (each with different security levels) approach a single browser 104, certain portions of the display may have to be obscured for either, both, or neither of the persons. In these and similar cases, then, the location and security information must be shared efficiently between the location GUI 112, the security server 114, and the context manager 110, so that the context manager 110 may make an appropriate determination and provide appropriate instruction to the mediator 106.

The CBM server 116 may be, for example, the Elvin system produced by the Distributed Systems Technology Center (DSTC), or may be some other type of content-based messaging services such as, for example, Gryphon (produced by International Business Machines (IBM)), or Keryx (a Java-notification service produced by Hewlett Packard).

Additionally, other types of messaging services may be used in conjunction with the system 100. For example, a publish/subscribe messaging service may be used to share information between the context manager 110, the location GUI 112, the security system 114, and the mediator 106. Such publish/subscribe systems allow producers of messages to broadcast those messages to previously-listed parties who have an interest in receiving messages of a certain type. In system 100, for example, the security system 114 may be considered to be a publisher of security information for individuals, a type of information for which the context manager 110 may be considered to be a subscriber.

In this way, the context manager 110 would have access to this information, so as to make decisions about what information, if any, should be restricted from display in the browser 104. As discussed in more detail below, the CBM server 116 also may provide similar messaging functionality, in a more expedited and efficient manner. Other types of messaging systems also could be used.

Figure 2:
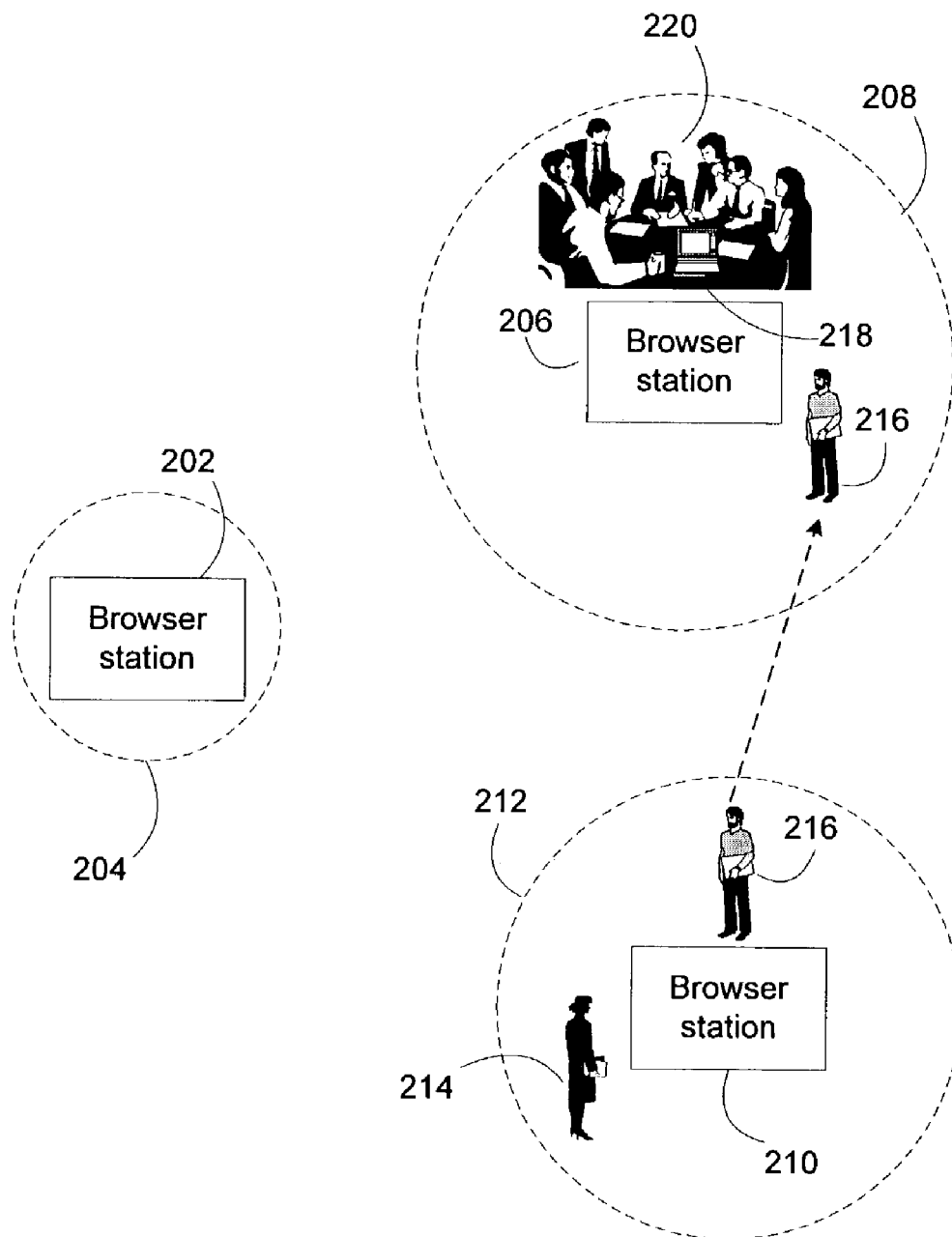
FIG. 2 is an illustration of a network setting in which the sensitive display system 100 of FIG. 1 is implemented.

FIG. 2 is an illustration of a network setting in which the sensitive display system 100 of FIG. 1 is implemented. In FIG. 2, a browser station 202 is associated with a perimeter 204 that defines a distance around browser station 202. Similarly, a browser station 206 is associated with a perimeter 208, and a browser station 210 is associated with a perimeter 212. Although the perimeters 204, 208, and 212 are shown in FIG. 2 as being circular, it should be understood that various other perimeters may be set, including directional perimeters defined by a viewing area of a relevant display.

The browser stations 202, 206 and 210 may be, for example, various computers within an enterprise setting. For example, the browser station 202 might represent a computer within a lobby of the enterprise, accessible to employees as well as visitors of the enterprise. The browser station 210 might represent, for example, a computer in an office of an employee 214. In this case, an employee 216 may be located in the office of the employee 214, and thus within the perimeter 212 (i.e., defined in this case by the office).

In the case where a security classification of the employee 214 is higher than that of a security classification of the employee 216, the sensitive display system 100 of FIG. 1 may be used to restrict information being shown on the browser station 210, while the employee 216 is within the perimeter 212. As another example, when the browser station 210 is currently displaying information that is private to the employee 214, such as, for example, personal information of the employee 214 such as a social security number or home address, then the sensitive display system 100 of FIG. 1 also may be used to restrict display of this information on the browser station 210 while the employee 216 is within the perimeter 212.

The browser station 206, meanwhile, may represent a laptop computer 218 being used by participants within a meeting 220. In the case where the employee 216 leaves the perimeter 212 and enters the perimeter 208, the sensitive display system 100 of FIG. 1 may determine restrictions on information being displayed on the browser station 210. The sensitive display system 100 may then begin enforcing restrictions on the display of the browser station 206 (i.e., the laptop computer 218). The latter example assumes, of course, that a nature of information being displayed on the laptop computer 218 relative to an identity of the employee 216 warrants such a restriction, as determined by the context manager 110 of the system 100.

Due to, for example, the centralized nature of the sensitive display system 100, minimal effort or involvement on the part of (most or all) users of the information is required in order to maintain security of information within an enterprise or other network setting. Further, an extent to which particular information is restricted, relative to specific individuals, may be easily maintained and modified by network administrators. Additionally, such implementation and maintenance features may be modified, maintained, and implemented by the network administrators (or other qualified individuals) very quickly, perhaps nearly in real-time or better.

Figure 3:
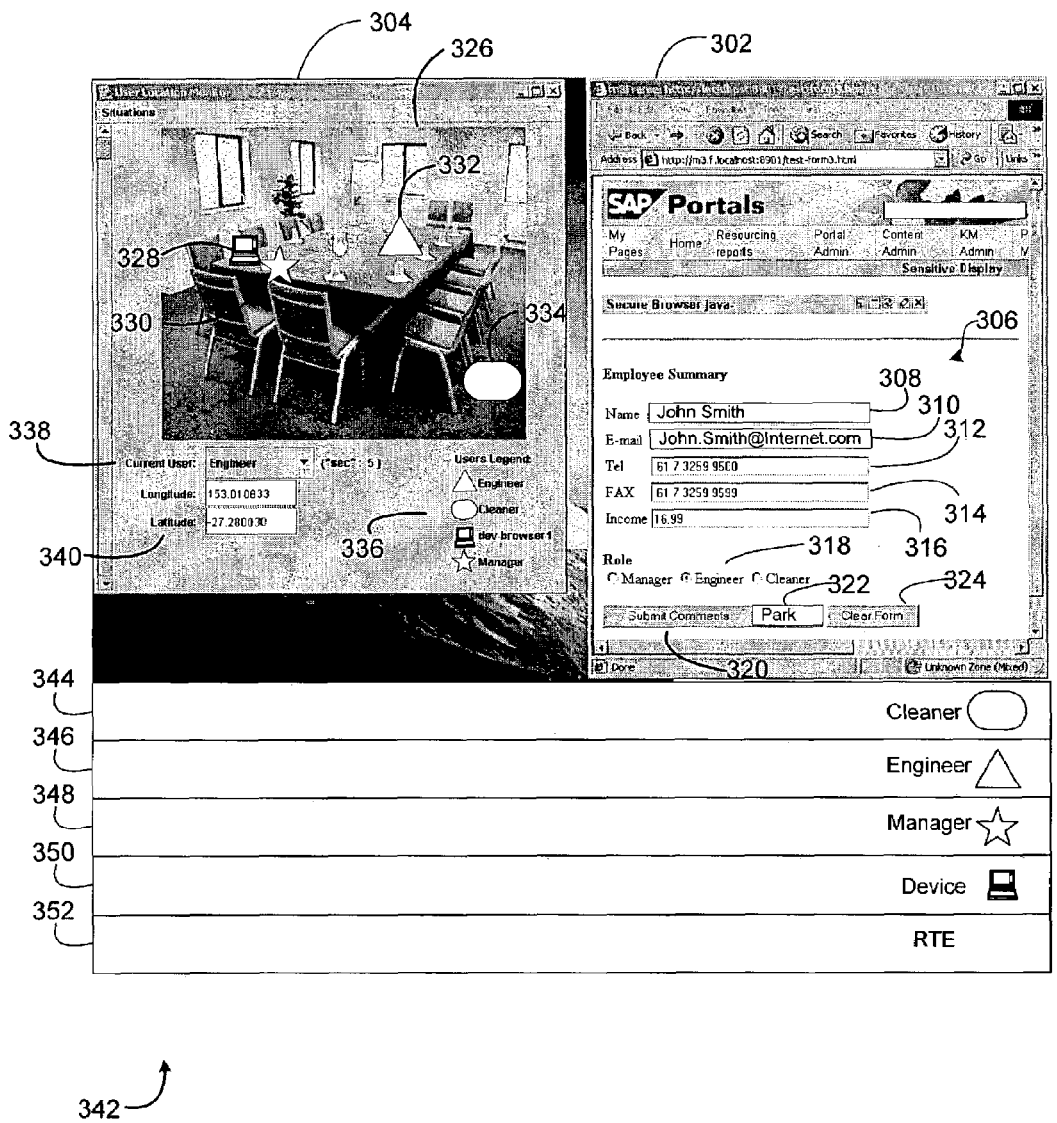
FIGS. 3-5 are screen shots output by the sensitive display system 100 of FIG. 1.

FIG. 3 is a screen shot 300 output by the sensitive display system 100 of FIG. 1. In FIG. 3, a screen portion 302 represents a page requested by a user. More specifically, in this example, the screen portion 302 represents a portal page that is associated with the user and produced by the enterprise that employs the user.

A location monitor 304 displays a picture of a relevant setting, as well as information pertaining to an identify, location, and security classification level(s) of individuals within the setting. The location monitor 304 also displays location information pertaining to a device displaying the screen shot 300. Thus, the location monitor may be thought of as conveying information about a browser station and associated perimeter, such as those shown in FIG. 2. Further, it should be understood that the location monitor 304 may correspond to the location GUI 112 of FIG. 1.

A screen portion 306 contains information about an employee. The information includes a name of the employee in a line 308, an e-mail address of the employee in line 310, a telephone number of the employee in line 312, a fax number of the employee in line 314, and an income level of the employee in line 316. Further, the screen portion 306 includes a role (e.g., job description) of the employee in section 318. The screen portion 306 also includes a button 320 for submitting information entered into screen portion 306, a button 322 for "parking" current field values for later use (i.e., for saving a current state of a user application by pushing the current values back to the mediator 106 for later use, perhaps at a different (more secure) location; this functionality may be particularly useful with respect to forms containing a large number of entries), and a button 324 for clearing information entered into the screen portion 306.

The location monitor 304 includes a representation 326 of, as already mentioned, a conference room. In the representation 326, various icons are used to represent devices and/or users of those devices, to be used in implementing the sensitive display system 100 of FIG. 1. For example, a laptop icon represents a laptop computer 328, a star icon represents a manager 330, a triangle icon represents an engineer 332, and an elliptical icon represents a cleaner 334.

A users legend 336 tracks the relationship between the icons and their respective represented devices and/or users. Meanwhile, a section 338 of the location monitor 304 displays a current user of the sensitive display system 100, as well as an associated security level of that user. In one implementation, the section 338 includes a drop-down menu for easily selecting between different users. Finally in the location monitor 304, a section 340 represents a location of the user listed in the section 338, in terms of a latitude and longitude of that user.

A section 342 contains information about relevant devices, users, and user classification levels, and assists the mediator 106 in restricting a display of information within the screen portion 306, as discussed in more detail below with respect to FIGS. 4 and 5. More specifically, the section 342 includes a line 344 for information about the cleaner 334, a line 346 for information relevant to the engineer 332, and a line 348 for information relevant to the manager 330. Further, the section 342 contains a line 350 for information about the laptop computer device 328, as well as a line 352 for relating information about the users and their security levels to the laptop device 328 and its associative display.

In one implementation, the section 342 may represent a "hidden frame" that is not viewable to a viewer of the screen portion 306. Such a hidden frame is essentially an independent web page, or a web page within a web page. That is, it has its own uniform resource locator (URL), can be operated as its own web page, and can communicate with other frames within a set of frames composing a given web page. For example, in the screen shot 300, the screen portion 302 and the location monitor 304 also may be designed as frames within the overall screen shot 300.

More specifically, a hidden frame often is a frame with the size set to zero (or nearly zero), so that the frame may contain information that is not immediately viewable to a user of the web page. As discussed in more detail below, the hidden frame can thus be refreshed or revised separately from any viewable frames, and, further, can be designed so as to update only one field at a time within another one(s) of the remaining frames (for example, a value for a particular field may be loaded into (or stored in) the hidden frame using, for example, javascript, a scripting language generally used to design interactive web sites, and then loaded from the hidden frame into the particular field when permitted by the sensitive display system 100).

Such a hidden frame may be used in conjunction with a session manager associated with the mediator 106. In one implementation, this session manager is written as a java servlet application. A Java servlet is a server-side program, written in the programming language Java, that may be executed from within a plurality of other applications, including remote client-side applications. Java servlets allow dynamic interactions with users, and are persistent (meaning that, once invoked, they can be maintained in memory and fill multiple requests). In other implementations, however, such a session manager may be written as a variety of applications, and/or using a number of different programming languages. For example, the session manager could be written as a common gateway interface (CGI) program.

Such a session manager may be responsible for, for example, initiating and maintaining an active session between the mediator 106 and the browser 104 (e.g., screenshot 300). More specifically, the session manager might maintain an inventory of information (e.g., received from the context manager 110) regarding which users are within a perimeter of a relevant device, as well as what information is being currently shown on that device.

Upon making a decision that information displayed within the screen shot 300 should be restricted, such a session manager within the mediator 106 may send out a message within the hidden frame of section 342 to refresh and/or update information within the screen portion 306. In this way, portions of the information within the screen portion 306 may be updated at a given point in time, so as to be restricted from display.

Figure 4:
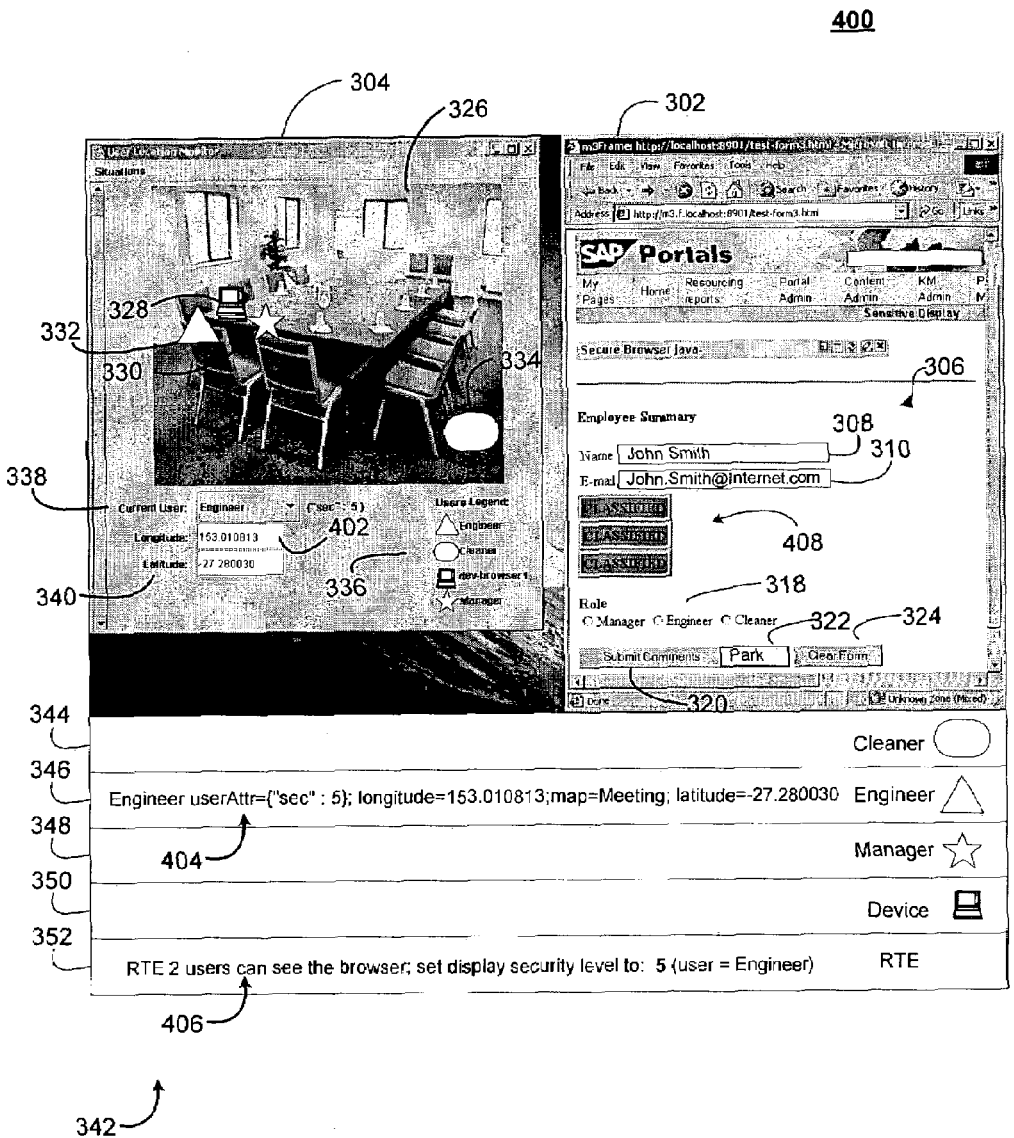

For example, in a screenshot 400 of FIG. 4, the location monitor 304 indicates that the engineer 332 has moved to a new location, as indicated by longitude information 402, and is within a predefined perimeter of the laptop device 328. As a result, information 404 within the line 346 provides information about the engineer 332, as well as a location and security classification of the engineer 332.

Thus, information 406 within the line 352 indicates that two users (i.e., the engineer 332 and the manager 330) can see the display of the laptop device 328, and communicates that the display security level should be set to a level corresponding to that of the engineer 332. This information is shared between the context manager 110, the security system 114, and the location GUI 112, via the CBM server 116. In this way, the context manager 110 communicates with the security system 114 to determine information that is to be restricted from the screen portion 306. As a result, in screen portion 306, a section 408 is designated as classified and corresponding information (i.e., a telephone or fax number, income level) are hidden from view.

Figure 5:
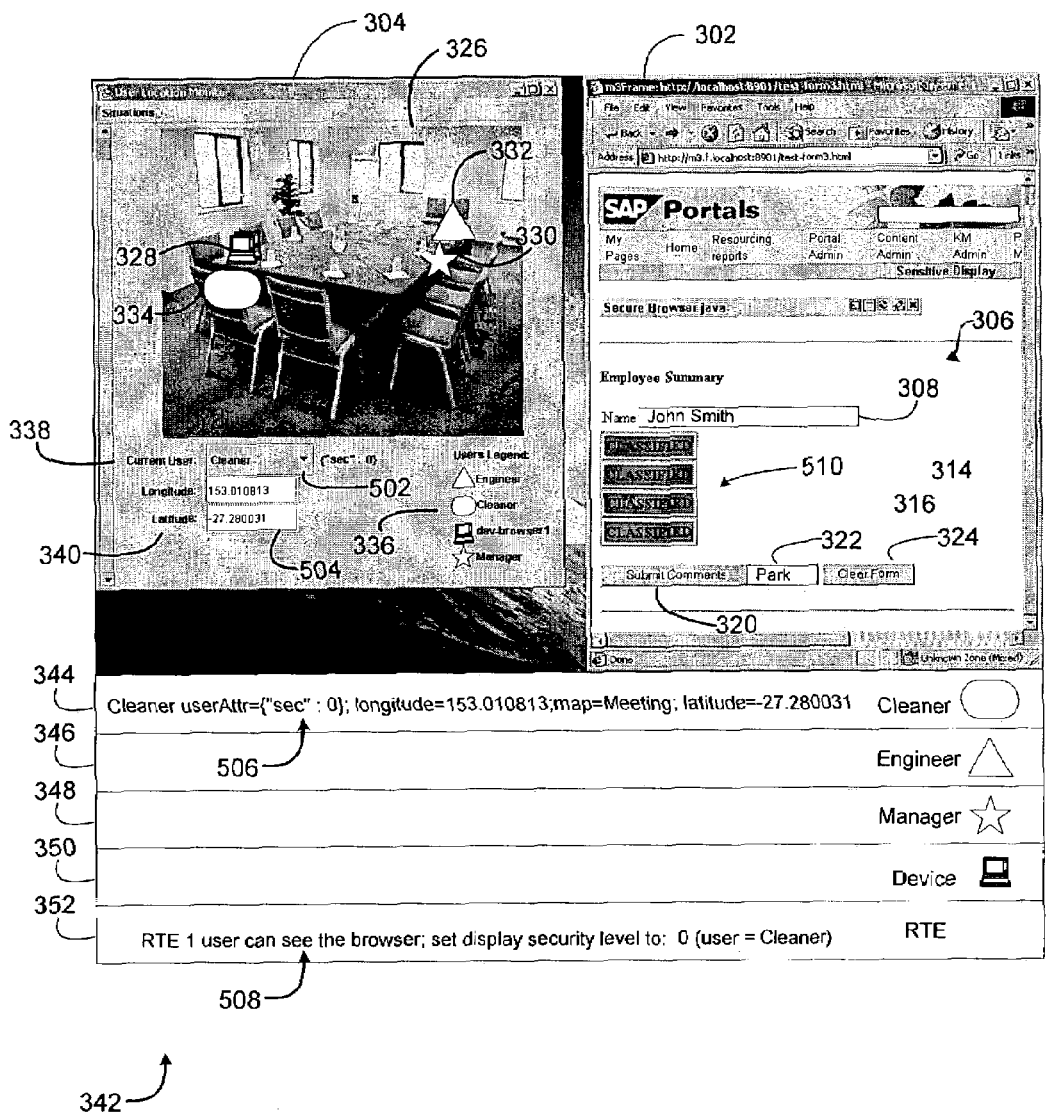

In FIG. 5, the location monitor 304 indicates that the engineer 332 has again changed location, and is outside of a perimeter associated with the laptop device 328. However, the cleaner 334 has now relocated. The re-location of the cleaner 334 is reflected in the information 502 within the section 338, as well as the new latitude information 504 that is within the section 340.

As a result, information 506 within the section 344 reflects this updated user, location, and security level information. Information 508 within the line 352 also is updated to reflect the fact that one user (i.e., the cleaner 334) can see a display of the laptop device 328. As a result, the mediator 106 sets the security level of the display of the laptop device 328 to a lower level. Thus, in the section 510, additional information is restricted from view and marked as classified. It also should be noted in the example of screen shot 500 of FIG. 5 that the manager 348 also has relocated, as indicated within the location monitor 304.

In some implementations, including the example of FIGS. 3-5, users may indicate relocation of themselves or other users simply by moving the corresponding icons within the location monitor 304. In other implementations, security badges or other transmitting devices, including, for example, a global positioning system (GPS), may be used to automatically track location information relative to particular users. Such automatic location information could be used in conjunction with, or as an alternative to, the location GUI 112 of FIG. 1. As a result, in various implementations, the location monitor 304 within screen shots 300, 400, and 500 may or may not be visible to a particular user of the corresponding display device.

The mediator 106 also may be responsible for saving current values of restricted-view fields (e.g., fields 312, 314, and 316 in the section 408 of FIG. 4). In this way, upon a relocation of a user, the mediator 106 may replace the classified sections of the display screen with their previous and/or current values. Although the hidden frame 342 is used in FIGS. 3-5, the sensitive display system 100 of FIG. 1 also could be implemented by requiring users to simply click on a submit or refresh button within the browser window.

In the section 338 of the screen shots 300, 400, and 500, the security level of a particular user may be set by a user of the location monitor 304. Alternatively, an administrator may set such security levels from a central location. In either case, the mediator 106 may collect the settings and see that they are stored, without participation by a back-end system (e.g., including the server 102). As a further alternative, the enterprise system may include security values as initial field values, which may be collected by the mediator 106 and removed when passed through to the user.

Figure 6:
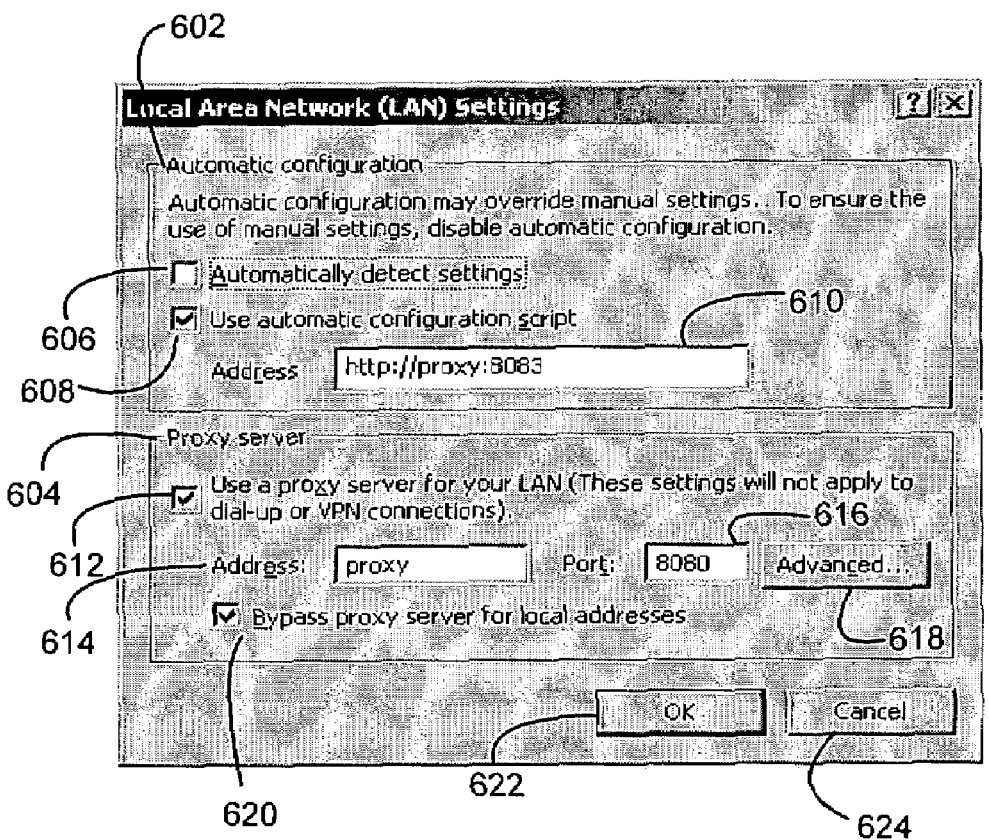
FIG. 6 is a screen shot of a configuration screen for configuring the sensitive display system of FIG. 1.

FIG. 6 is a screen shot 600 of a configuration screen for configuring the mediator 106 of the sensitive display system 100 of FIG. 1. In FIG. 6, an automatic configuration section 602 allows the browser to automatically detect proxy settings or to use an automatic proxy script, whereas a proxy server section 604 allows the user to select a specific proxy server for a network connection.

As discussed above, the mediator 106 functions in some way similar to a proxy, and therefore can be accessed by the user via proxy settings of screen shot 600. In particular, a user can disable a browser from automatically detecting whatever proxy settings are available by de-selecting a box 606, and may input an automatic proxy configuration script by selecting a box 608 and entering an address for the proxy in line 610. The proxy server section 604 allows the user to specify use of a particular proxy server for the network connection by selecting a box 612 and specifying an address information 614 and a port information 616. An "advanced" button 618 allows the user to further set proxy settings in a separate window (not shown).

The user may select or bypass the selected proxy server in the case where local addresses are selected, by selecting a box 620. The user may then apply the selected settings by clicking an OK button 622, or may cancel the selected changes by selecting a cancel button 624.

Figure 7:
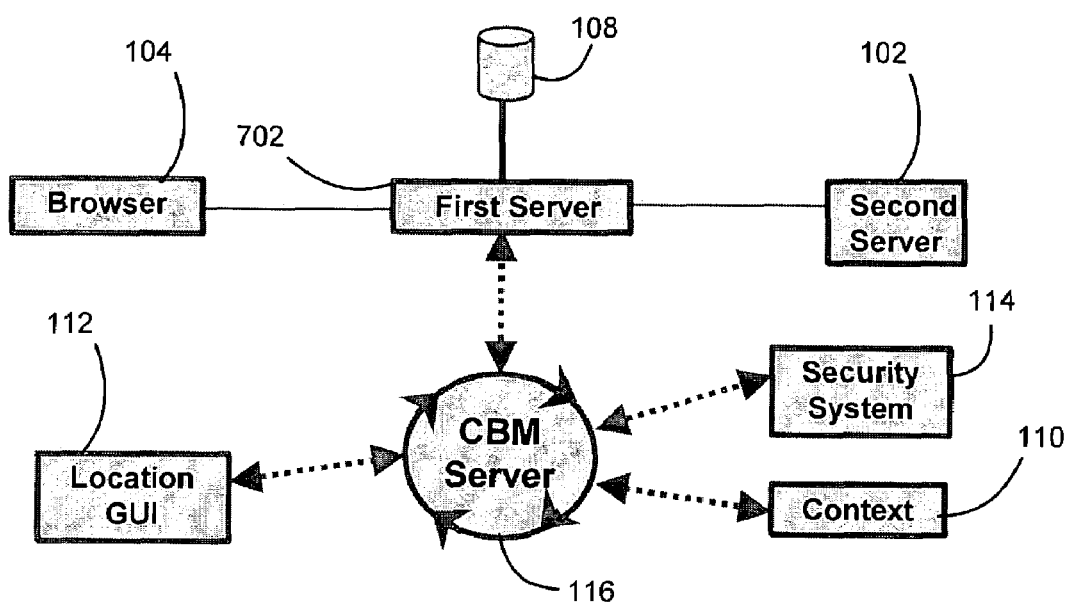
FIG. 7 is a block diagram of a second implementation of a sensitive display system.

FIG. 7 is a block diagram of a second implementation of a sensitive display system 700. The sensitive display system 700 of FIG. 7 shares many components with the sensitive display system 100 of FIG. 1. However, in FIG. 7, the mediator 106 is shown as a first web server 702. More specifically, the first web server 702 may literally be a web server, or may be a device such as the mediator 106 that emulates a web server with respect to the browser 104.

In FIG. 7, then, the first web server 702 does not act in as a proxy in the sense(s) described above with respect to the mediator 106. Rather, the first web server 702 acts as the server for all practical purposes for the browser 104 (or other client), which may obviate the need for proxy-type communications and settings such as those described above (e.g., with respect to FIG. 6). Thus, a user of the browser 104 does not need to, for example, make the settings modifications described with respect to FIG. 6.

In response to communications from the browser 104, the first server 702 communicates with the (second) server 102, and emulates data input into the browser 104 so as to, for example, gain the appropriate content from the second server 102 while masking (to the browser 104) the fact that the second server 102 is being accessed. For example, the first server 702 may gain content from the second server 102 and modify Uniform Resources Locator (URL) strings (e.g., a URL associated with a particular graphics file) to point to itself, rather than to the second server 102. Thus, the user of the browser 104 need not even be aware that these functions are being performed by the first server 702.

This type of client-server-server communication described with respect to FIG. 7 is otherwise similar to the sensitive display system 100 of FIG. 1, and thus provides for the temporary obstruction of sensitive data on the browser 104 in a similar manner.

As described above, the sensitive display system 100 allows for mediation of content provided from a source to a recipient, such as from a web server to a web browser. Mediation may involve intercepting the content, and augmenting/restricting the content through a browser-push or auto-refresh mechanism, perhaps using a hidden frame, so as to restrict or otherwise control information displayed on a display of the recipient device.

In this way, an integrated security system allows restricted information to be replaced with security status messages, or other desired content, or to be simply removed. Thus, when users come within a specified distance from the active display area, the security classification level of the approaching user is used to determine whether there should be any change in the display. If so, a mediating device causes a browser push to occur, to thereby block or otherwise restrict some or all of the display.

In various implementations, this management of information being displayed may be achieved through an active browser session. Environment information may be broadcast in conjunction with multiple communication modes (e.g., browser-based and publish/subscribe), where the communication modes are merged to thereby affect an augmented browser content delivery system.

Also, although the above implantations have discussed server-client environments, it also is possible to implement a sensitive display system on a single computer/display device. For example, such a device may have access to all of the necessary and relevant location, security, and content information, e.g., could be located in the position of the mediator

106. In this implementation, however, the CBM server 116 or other messaging/routing needs may be less than in the implementations described above (although the CBM server 116 may still be used for functions such as, for example, collection of security information), as the device would generally only be responsible for itself and its own location.

A number of implementations have been described. Nevertheless, it will be understood that various modifications may be made. Accordingly, other implementations are within the scope of the following claims.

What is claimed is:

1. A method for providing secure viewing of a display screen comprising:
   transmitting a communication from a server computer to a client computer, where the client computer is operable to communicate with the display screen to display the communication;
   determining, before the communication is displayed, an identity of each person who is present in an area where the display screen is located, the area comprising a pre-determined distance from the display screen;
   identifying, using the determined identity and before the communication is displayed, a portion of the communication that at least one person who is present in the area is unauthorized to view;
   displaying the communication on the display screen, wherein a section of the display screen corresponding to the identified portion is obscured;
   tracking, at least while the display screen contains the communication, location information for each person who is present in the area, the location information indicating where in the area each person is located relative to the display screen;
   displaying an area representation on the display screen that visually represents the area where the display screen is located, the area representation based on the location information and including: a first icon indicating where in the area the display screen is located, and at least one second icon indicating where in the area each person who is present in the area is located; and
   updating the area representation, based on the tracking of the location information, to move the second icon based on a relocation of a person who is present in the area.

2. The method of claim 1 wherein transmitting the communication comprises intercepting the communication at an intermediate device.

3. The method of claim 1 wherein determining the identity comprises:
   transmitting identification information related to the person to a security system; and
   receiving a security clearance level of the unauthorized person from the security system, based on the identification information.

4. The method of claim 3 wherein transmitting identification information and receiving the security clearance level comprise transmitting the identification information and receiving the security clearance level using a publish/subscribe messaging system.

5. The method of claim 3 wherein transmitting identification information and receiving the security clearance level comprise transmitting the identification information and receiving the security clearance level using a content-based messaging system.

6. The method of claim 3 wherein the section of the display screen to be obscured is identified based on the security clearance level.

7. The method of claim 3 wherein transmitting the communication comprises:
   attaching a message to the communication, the message containing fields; and
   inserting data into the fields, the data including the identification information and the security clearance information;
   wherein the section of the display screen to be obscured is identified based on the data.

8. The method of claim 7 wherein the message includes a hidden frame that is not visible on the display screen as part of the communication.

9. The method of claim 1, further comprising:
   saving a current version of the communication;
   determining that the person has moved outside of the area; and
   displaying, in response to the determination that the person has moved outside of the area, the communication in its entirety, including the portion.

10. The method of claim 1, further comprising maintaining an active session with the client computer while the communication is displayed with the section obscured.

11. The method of claim 1 further comprising performing an automatic refresh of the communication with respect to the client computer.

12. The method of claim 1, wherein tracking the location information comprises receiving a transmission from a transmitter associated with the person once the person is within the predetermined distance of the display screen, the transmission containing identification information related to the person.

13. A system for securing a portion of a display screen from viewing, the system comprising:
   a positioning subsystem operable to track, at least while a communication is displayed on the display screen, location information for each person who is present in an area where the display screen is located, the area comprising a pre-determined distance from the display screen, the location information indicating where in the area each person is located relative to the display screen;
   a security subsystem operable to determine, at least before the communication is displayed, an identity of each person who is present in the area, and to identify, using the determined identity, a portion of the communication that the person is unauthorized to view; and
   a mediation subsystem operable to receive the communication from a server computer and forward the communication to a client computer for display on the display screen with the portion of the data obscured from display, and to cause the client computer to display an area representation on the display screen that visually represents the area where the display screen is located, the area representation based on the location information and including: a first icon indicating where in the area the display screen is located, and at least one second icon indicating where in the area each person who is present in the area is located, wherein the client computer further updates the area representation, based on the tracking of the location information, to move the second icon based on a relocation of a person who is present in the area.

14. The system of claim 13 wherein the mediation subsystem is operable to obscure the portion based on a position indication in the position information that a potential viewer is within the pre-determined distance of the display screen, and a security indication in security clearance information that the potential viewer is associated with a security clearance level that is insufficient to permit viewing of the portion.

15. The system of claim 14 further comprising a context subsystem operable to determine the position indication and the security indication for forwarding to the mediation subsystem.

16. The system of claim 13 wherein the mediation subsystem comprises a session manager that is operable to maintain an active session between itself and the client computer.

17. The system of claim 13 wherein the mediation subsystem is operable to obscure the portion by initiating a refresh of the display screen.

18. The system of claim 17 wherein the mediation subsystem is operable to initiate the refresh by including a hidden frame with the data when forwarding the data to the client computer.

19. The system of claim 13 wherein the positioning subsystem includes a receiver operable to receive updated position information from a location transmitter associated with a specific person, to thereby track a movement of the specific person.

20. The system of claim 19 further comprising a communications subsystem operable to route the position information and the security clearance information between the positioning subsystem, the security subsystem, and the mediation subsystem.

21. The system of claim 20 wherein the communications subsystem includes a publish/subscribe messaging system.

22. The system of claim 20 wherein the communications subsystem includes a content-based messaging system.

23. A method for providing secure viewing of a display screen comprising:
   transmitting a communication from a server computer to a client computer, where the client computer is operable to communicate with the display screen to display the communication;
   displaying the communication on the display screen;
   tracking, at least while the display screen contains the communication, location information for each person who is present in an area where the display screen is located, the area comprising a pre-determined distance from the display screen, the location information indicating where in the area each person is located relative to the display screen;
   displaying an area representation on the display screen that visually represents the area where the display screen is located, the area representation based on the location information and including: a first icon indicating where in the area the display screen is located, and at least one second icon indicating where in the area each person who is present in the area is located;
   detecting that a person enters the area;
   determining an identity of the person detected to enter the area;
   identifying, using the determined identity and in response to detecting the person, a portion of the communication presently displayed on the display screen that the detected person is unauthorized to view;
   obscuring, in response to identifying the portion, a section of the display screen corresponding to the identified portion; and
   updating the area representation, based on the tracking of the location information and in response to detecting the person, to include at least another second icon corresponding to the detected person.

24. The method of claim 23 wherein the location information is received from a location transmitter associated with the person.

25. The method of claim 23 further comprising:
   transmitting the location information and security information to a context subsystem that is operable to output a modification order containing instructions for obscuring the section; and
   transmitting the modification order to a mediation subsystem that causes the client computer to obscure the section based on the modification order.

26. The method of claim 25 wherein transmitting the location information, the security information, and the modification order comprises routing the location information, the security information, and the modification order using a content-based messaging system.

27. The method of claim 23 wherein obscuring the section comprises obtaining a current version of a page of information from the server computer storing the current version.

28. The method of claim 23 wherein obscuring the section comprises sending a cached version of a page of information from a proxy server storing the cached version.

* * * * *